United States Patent
Arndt et al.

(10) Patent No.: US 7,478,246 B2
(45) Date of Patent: Jan. 13, 2009

(54) METHOD FOR PROVIDING A SCALABLE TRUSTED PLATFORM MODULE IN A HYPERVISOR ENVIRONMENT

(75) Inventors: Richard Louis Arndt, Austin, TX (US); Steven A. Bade, Georgetown, TX (US); Thomas J. Dewkett, Staatsburg, NY (US); Charles W. Gainey, Jr., Poughkeepsie, NY (US); Nia Letise Kelley, Austin, TX (US); Siegfried Sutter, Boeblingen (DE); Helmut H. Weber, Dettenhausen (DE)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 10/902,670

(22) Filed: Jul. 29, 2004

(65) Prior Publication Data

US 2006/0026419 A1    Feb. 2, 2006

(51) Int. Cl.
  *G06F 11/30* (2006.01)
  *H04K 1/10* (2006.01)
(52) U.S. Cl. .................. 713/189; 713/193; 713/194; 380/34
(58) Field of Classification Search .................. 713/150
  See application file for complete search history.

(56) References Cited

U.S. PATENT DOCUMENTS

| | | | |
|---|---|---|---|
| 6,279,046 B1 | 8/2001 | Armstrong et al. | |
| 6,690,400 B1 * | 2/2004 | Moayyad et al. | 715/779 |
| 6,971,002 B2 * | 11/2005 | Austen et al. | 713/1 |
| 7,114,051 B2 * | 9/2006 | Guu et al. | 711/173 |
| 7,127,585 B2 * | 10/2006 | Shimada et al. | 711/173 |
| 2003/0041250 A1 * | 2/2003 | Proudler | 713/182 |
| 2004/0215948 A1 * | 10/2004 | Abbey et al. | 713/1 |
| 2005/0235141 A1 | 10/2005 | Ibrahim et al. | |
| 2007/0067366 A1 * | 3/2007 | Landis | 707/205 |

OTHER PUBLICATIONS

Bade et al., Method, Apparatus, and Product for Providing a Multi-Tiered Trust Architecture, filed Jul. 29, 2004.
U.S. Appl. No. 10/902,712, Bade et al., Method, Apparatus, and Product for Asserting Physical Presence with a Trusted Platform Module in a Hypervisor Environment, filed Jul. 29, 2004.
U.S. Appl. No. 10/902,711, Bade et al., Method, Apparatus, and Product for Providing a Backup Hardware Trusted Platform Module in a Hypervisor Environment, filed Jul. 29, 2004.

* cited by examiner

*Primary Examiner*—Nasser Moazzami
*Assistant Examiner*—Fatoumata Traore
(74) *Attorney, Agent, or Firm*—Duke W. Yee; Diana Roberts Gerhardt; Lisa L. B. Yociss

(57) ABSTRACT

A method is described for implementing a trusted computing environment within a data processing system where the data processing system includes a single hardware trusted platform module (TPM). Multiple logical partitions are provided in the data processing system. A unique context is generated for each one of the logical partitions. When one of the logical partitions requires access to the hardware TPM, that partition's context is required to be stored in the hardware TPM. The hardware TPM includes a finite number of storage locations, called context slots, for storing contexts. Each context slot can store one partition's context. Each one of the partitions is associated with one of the limited number of context storage slots in the hardware TPM. At least one of the context slots is simultaneously associated with more than one of the logical partitions. Contexts are swapped into and out of the hardware TPM during runtime of the data processing system so that when ones of the partitions require access to the hardware TPM, their required contexts are currently stored in the hardware TPM.

16 Claims, 6 Drawing Sheets

METHOD FOR PROVIDING A SCALABLE TRUSTED PLATFORM MODULE IN A HYPERVISOR ENVIRONMENT

CROSS-REFERENCE TO RELATED APPLICATIONS

The subject matter of the present invention is related to the subject matter of co-pending U.S. patent applications: Ser. No. 10/902,669, entitled METHOD, APPARATUS, AND PRODUCT FOR PROVIDING A MULTI-TIERED TRUST ARCHITECTURE, Ser. No. 10/902,712 entitled METHOD, APPARATUS, AND PRODUCT FOR ASSERTING PHYSICAL PRESENCE WITH A TRUSTED PLATFORM MODULE IN A HYPERVISOR ENVIRONMENT, and Ser. No. 10/902,711, entitled METHOD, APPARATUS, AND PRODUCT FOR PROVIDING A BACKUP HARDWARE TRUSTED PLATFORM MODULE IN A HYPERVISOR ENVIRONMENT, all filed on the same date herewith, assigned to the same assignee, and incorporated herein in its entirety by reference.

BACKGROUND OF THE INVENTION

1. Field of the Invention

The present invention relates to an improved data processing system and, in particular, to a method, apparatus, and computer program product for data storage protection using cryptography. Still more particularly, the present invention relates to a method, apparatus, and computer program product in a computing environment for providing a scalable physical hardware TPM that provides trust to a scalable number of logical partitions that require trust and that are currently supported by the environment.

2. Description of Related Art

Most data processing systems contain sensitive data and sensitive operations that need to be protected. For example, the integrity of configuration information needs to be protected from illegitimate modification, while other information, such as a password file, needs to be protected from illegitimate disclosure. As another example, a data processing system needs to be able to reliably identify itself to other data processing systems.

An operator of a given data processing system may employ many different types of security mechanisms to protect the data processing system. For example, the operating system on the data processing system may provide various software mechanisms to protect sensitive data, such as various authentication and authorization schemes, while certain hardware devices and software applications may rely upon hardware mechanisms to protect sensitive data, such as hardware security tokens and biometric sensor devices.

The integrity of a data processing system's data and its operations, however, centers around the issue of trust. A data processing system's data and operations can be verified or accepted by another entity if that entity has some manner for establishing trust with the data processing system with respect to particular data items or particular operations.

Hence, the ability to protect a data processing system is limited by the manner in which trust is created or rooted within the data processing system. To address the issues of protecting data processing systems, a consortium of companies has formed the Trusted Computing Group (TCG) to develop and to promulgate open standards and specifications for trusted computing. According to the specifications of the Trusted Computing Group, trust within a given data processing system or trust between a data processing system and another entity is based on the existence of a hardware component within the data processing system that has been termed the trusted platform module (TPM).

A trusted platform enables an entity to determine the state of the software environment in that platform and to seal data to a particular software environment in that platform. The entity deduces whether the state of the computing environment in that platform is acceptable before performing a transaction with that platform. To enable this, the trusted platform provides integrity metrics, also known as integrity measurements, to the entity that reflect the integrity of the software state of the trusted platform. The integrity measurements require a root of trust within the computing platform. In order for a system to be a trusted platform, the integrity measurements must be taken from the Core Root of Trust for Measurements and extended through the initial program load (IPL) process up to the point at which the operating system is initialized.

A trusted platform module has been generally described in a platform-independent manner, but platform-specific descriptions have been created for certain classes of systems, such as personal computers (PCs). Existing hardware for trusted computing has focused on implementations for a single hardware trusted platform module for a single system. This situation is sufficient for simple servers and PCs, which tend to be relatively low-performance computers that meet the needs of stand-alone computational environments or client-side processing environments.

High-performance servers, though, support partitionable, multithreaded environments that may need access to a trusted platform module on multiple threads simultaneously. This type of environment allocates, or partitions, physical resources to each of the supported multiple partitions. In addition, each partition can be thought of as a separate logical computer system that can execute its own operating system and applications. The operating system executed by one partition may be different from the operating systems being executed by the other partitions.

One hardware TPM is designed to provide support for a single, non-partitionable computer system. Thus, existing systems utilize a single hardware TPM to provide trust for the entire single system. These systems, however, were not partitionable environments. A problem then arises as to how to provide support for a partitionable environment which includes multiple partitions which each act as separate computer systems.

Another issue to consider in providing trust to a partitionable environment concerns the scalability of the partitionable environment. A partitionable environment may support any number of different partitions. For example, the environment may be booted to include four partitions and then later booted to support six partitions.

Therefore, it would be advantageous to have a mechanism in a partitionable environment which permits scaling of the environment by providing a scalable hardware TPM that provides trust to a scalable number of partitions that require trust and that are currently supported by the environment.

SUMMARY OF THE INVENTION

A method is described for implementing a trusted computing environment within a data processing system where the data processing system includes a single hardware trusted platform module (TPM). Multiple logical partitions are provided in the data processing system. A unique context is generated for each one of the logical partitions. When one of the logical partitions requires access to the hardware TPM, that partition's context is required to be stored in the hardware TPM. According to the present invention, a hardware TPM will now include multiple different hardware slots in which a partition's context is stored when that partition needs to access the TPM. Each hardware TPM will include a finite number of storage locations, called context slots, for storing contexts. Each context slot can store one partition's context at a time. Each one of the partitions is associated with one of the limited number of context storage slots in the hardware TPM. At least one of the context slots is simultaneously associated with more than one of the logical partitions. Contexts are swapped into and out of the hardware TPM during runtime of the data processing system so that when ones of the partitions require access to the hardware TPM, their required contexts are currently stored in the hardware TPM.

The hypervisor creates an extended partition, herein called a host partition, which owns the hardware Trusted Platform Module (TPM). This extended hypervisor partition presents the physical hardware TPM to other logical partitions as a virtual device. This extended partition is the only partition that is able to directly communicate with the physical TPM hardware. Those logical partitions with virtual TPM devices must use the extended hosting partition as a communication interface; such logical partitions are unable to directly access the TPM hardware. Each time that the hypervisor creates a logical partition within the data processing system, the hypervisor also instantiates a logical TPM within the reserved partition such that the logical TPM is anchored to the hypervisor-based TPM. The hypervisor manages multiple logical TPMs within the reserved partition such that each logical TPM is uniquely associated with a logical partition.

The single hardware TPM is used as a basis to create these logical TPMs for each partition. These logical TPMs provide access for each partition to the hardware TPM through the extended hypervisor host partition.

According to the prior art, the Trusted Computing Group (TCG) defines a context. According to the TCG standard, a context including two elements: persistent state information associated with the TPM, and the runtime state of the TPM. The TCG standard further defines exactly what information must be stored in the context.

According to the present invention, a separate context is generated for each partition in the system. Each context for a partition includes the information defined by the TCG and is required to be physically located in the TPM when that partition is attempting to use the TPM. A context encryption key is used to bind a partition to a particular TPM and is also used to encrypt and decrypt the contexts as described below. Each context is associated with a particular context slot using binding information that is stored with the context that identifies the particular associated context slot.

Each partition has an associated context that includes the partition's runtime TPM state and persistent state information. When the hardware TPM is providing its trust services to a particular partition, that partition's context must be stored within the hardware TPM itself. The hardware TPM, however, has only a limited amount of storage, also called context slots, in which these contexts can be stored. Thus, only a limited number of context slots are available in the hardware TPM. When the number of partitions that may require the TPM's services is greater than the number of available context slots, the present invention is utilized to dynamically swap contexts between context slots and other storage that is not located in the hardware TPM.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention is a method, apparatus, and computer program product for providing a scalable hardware TPM that provides trust to a scalable number of logical partitions that require trust and that are currently supported within a data processing system. A hardware TPM is used as the basis to create a logical TPM for each partition. Each partition has an associated context that must be stored in the hardware TPM when the hardware TPM is providing its services to that partition.

The hardware TPM includes a finite number of context hardware slots in which the contexts can be stored. Each partition is associated with, or bound to, a particular context slot in the hardware TPM. Binding a partition to a particular context slot preferably takes place when the data processing system, and thus each partition, is booted. This association is maintained until the data processing system is rebooted. Thus, a partition remains bound to the same context slot until the data processing system is rebooted. Some or all of the context slots may be simultaneously associated with more than one partition. For example, if the data processing system is booted with six partitions and the hardware TPM includes only four context slots, at least one of the slots will be associated with more than one partition.

A persistent context is created during the boot process for each partition that includes the partition's persistent state information. After the boot process has completed and the operating system is running, a runtime TPM state is created for and stored as part of each context. The runtime TPM state is encrypted. The context, including the encrypted runtime TPM state and persistent TPM state information, is then stored in the platform's protected storage. According to the example depicted below, these contexts are initially stored in the hypervisor's host partition in the platform's protected storage.

Those skilled in the art will recognize that the persistent context and runtime context can be stored in separate locations. The persistent context must remain in a non-volatile location, such as with other logical partition persistent data; the runtime context must either be stored directly, and decrypted, in the TPM or encrypted and stored outside of the TPM.

A context engine, also called a context manager, is described below which will execute the methods of the present invention. Those skilled in the art will recognize that the context engine may be located within the hardware TPM, hypervisor, or other device.

After the system has completed booting, a particular partition may need to access the hardware TPM through the particular partition's logical TPM. At this time, the context engine determines which context slot is associated with the particular partition. The binding information that is used to associate a context slot with a particular partition is stored with the logical partition's persistent data. If the context slot associated with the particular logical partition is empty, the particular partition's context is retrieved from protected storage, decrypted, and then stored in the context slot.

If the slot is not empty, the context manager determines whether the other partition, whose context is currently in the slot, is idle. If the other partition is idle, the context manager swaps contexts. The context for the other partition is retrieved from the slot, encrypted, and then migrated out of the context slot and stored into the platform's protected storage. The context for the particular partition is retrieved from protected storage, decrypted, and stored in the context slot.

In this manner, contexts are swapped between the context slots in the hardware TPM and other protected storage as needed to support an unlimited number of partitions. Thus, this single hardware TPM having limited storage for contexts is scalable and can support an unlimited number of logical partitions.

Figure 1A:
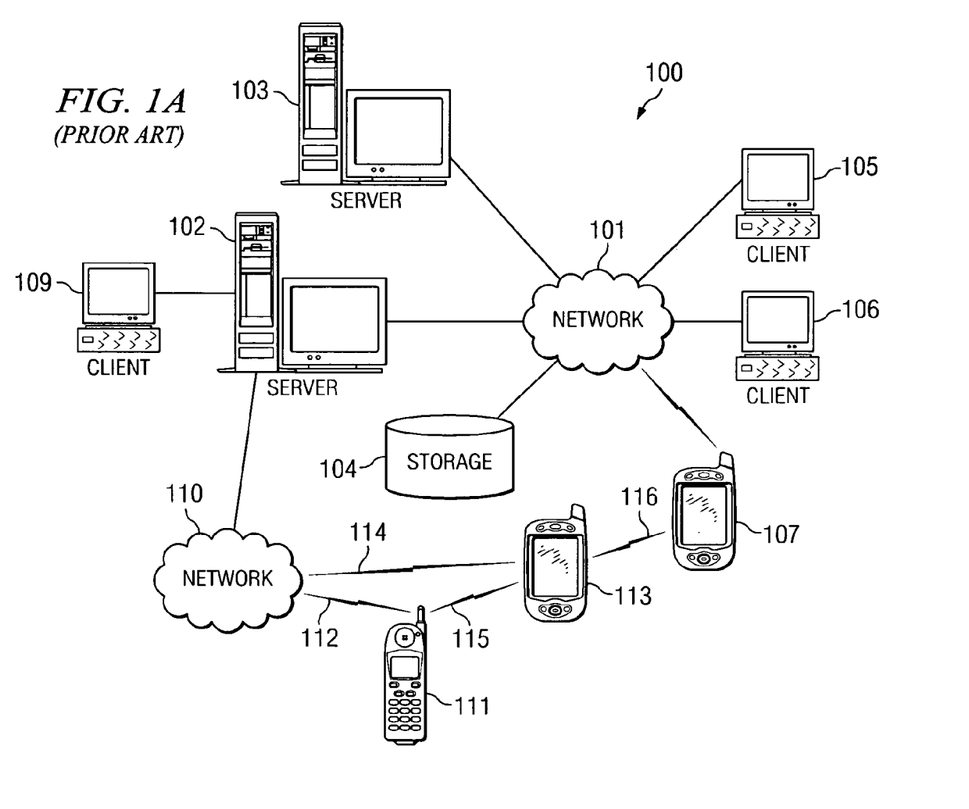
FIG. 1A depicts a typical network of data processing systems, each of which may be used to implement the present invention.

With reference now to the figures, FIG. 1A depicts a network of data processing systems, each of which may be used to implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

Figure 1B:
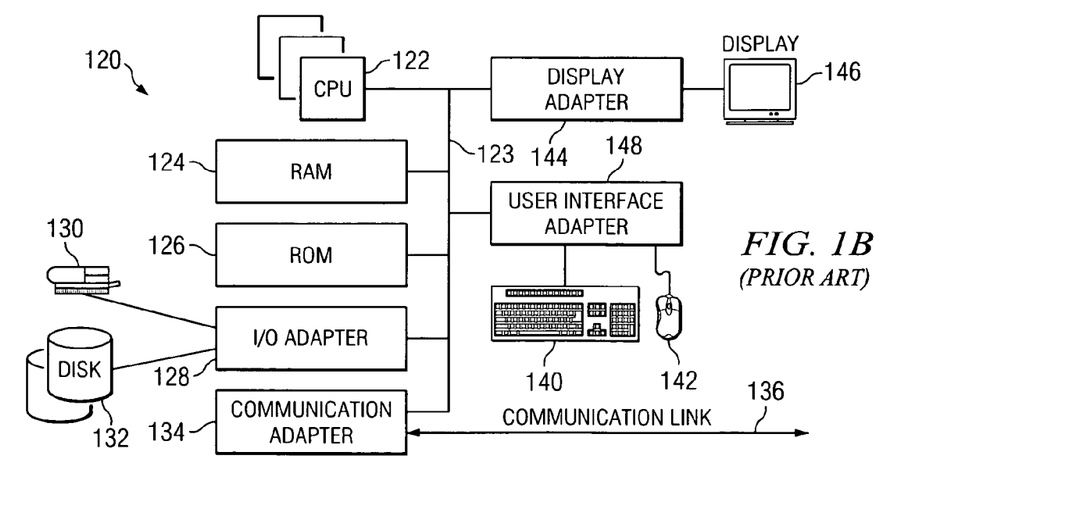
FIG. 1B depicts a typical computer architecture in which the present invention may be implemented.

FIG. 1B depicts a computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

Figure 1C:
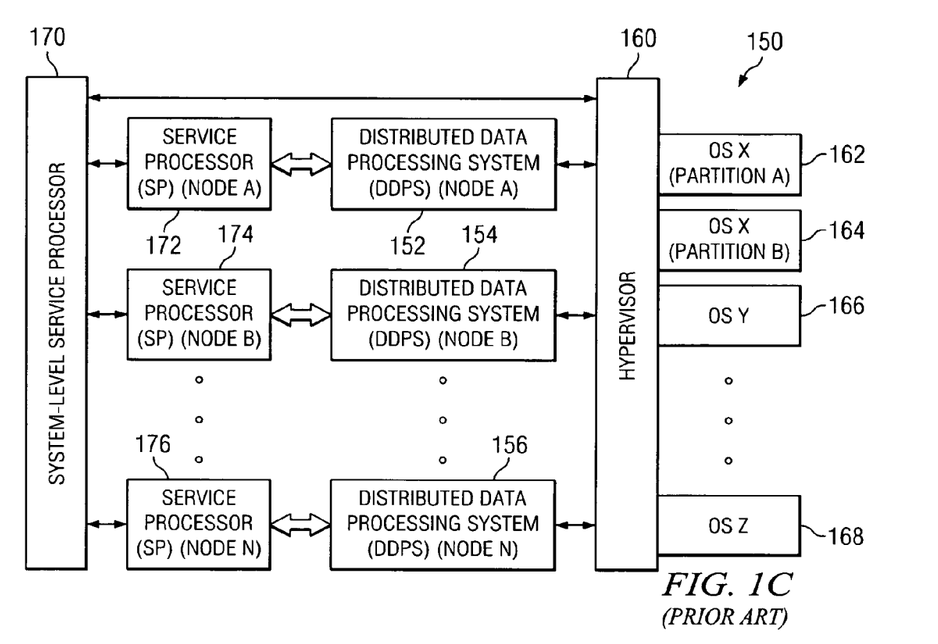
FIG. 1C depicts a block diagram that shows an example of a prior art distributed data processing system.

FIG. 1C depicts an example of a prior art distributed data processing system. Distributed data processing system 150 contains multiple nodes 152-156, each of which may represent a single-processor or multi-processor device or card connected to a communication switch or a network; nodes 152-156 may be implemented as central electronic complex (CEC) units. Hypervisor 160 supports multiple instances of one or more operating systems and/or operating system partitions 162-168 on the shared computational resources of the distributed data processing nodes of system 150. Hypervisor 160 communicates with system-level service processor 170, which is responsible for booting system 150 and for monitoring the availability of the shared resources. Each distributed data processing node is associated with a service processor, e.g., service processors 172-176, each of which is responsible for booting its associated node and for assisting system-level service processor 170 in monitoring each of the nodes; a service processor may be associated with a node through a variety of physical connections to its associated node, e.g., the service processor's hardware card may attach to a PCI bus. It should be noted that each node may have a plurality of service processors, although only one service processor would be responsible for booting its associated node.

The present invention could be implemented on a variety of hardware platforms and computational environments; FIG. 1A, FIG. 1B, and FIG. 1C are intended as examples of a heterogeneous computing environment and not as architectural limitations for the present invention.

In addition to being able to be implemented on a variety of hardware platforms and computational environments, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to trusted computing platforms. Before describing the present invention in more detail, though, some background information about trusted computing platforms is provided with reference to FIG. 2 for evaluating the operational efficiencies and other advantages of the present invention. Although the present invention may be implemented in conjunction with a variety of trusted computing platforms, possibly in accordance with one or more standards, the examples of the present invention hereinbelow employ the terminology and examples from the standards and/or specifications that have been promulgated by the Trusted Computing Group (TCG); it should be noted, though, that the examples are not meant to imply architectural, functional, nor definitional limitations with respect to embodiments of the present invention.

Figure 2:
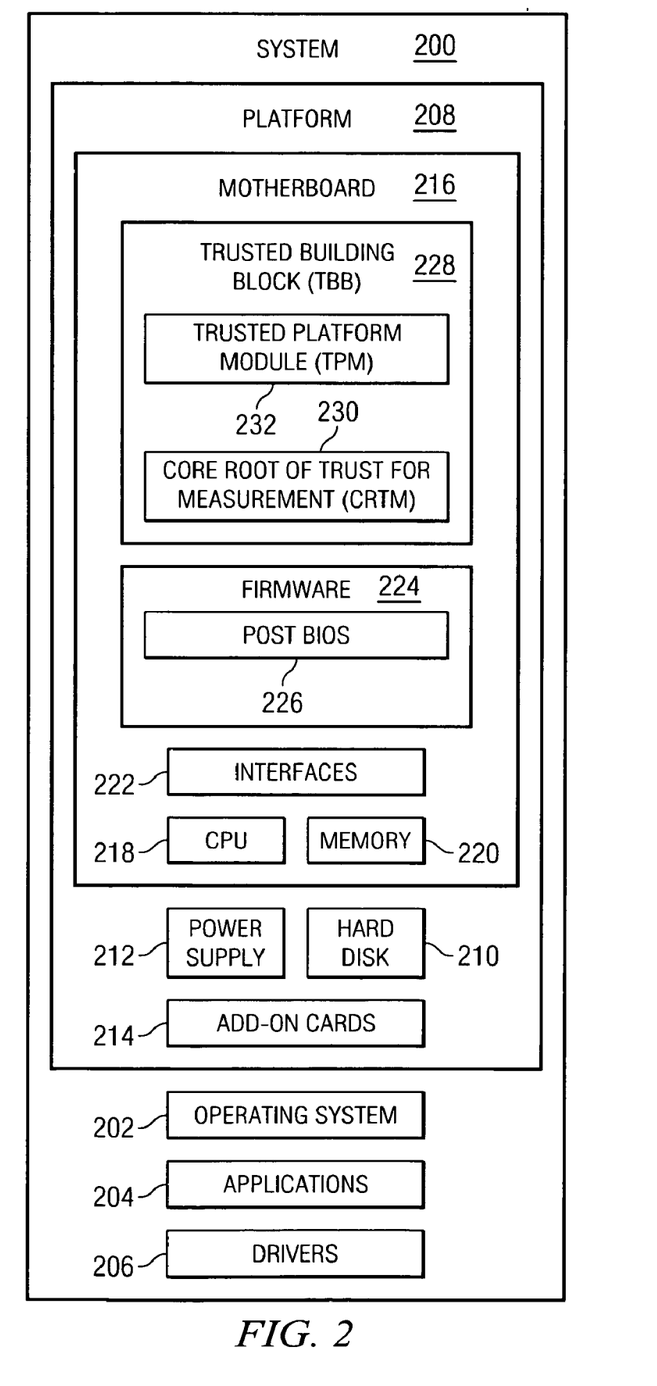
FIG. 2 depicts a block diagram that shows a modified trusted platform architecture in accordance with the present invention.

FIG. 2 depicts a trusted platform module that has been modified according to the present invention. Trusted platform architectures may be implemented for particular computational environments or for particular classes of devices. Except as noted below with regard to the present invention, the remaining components of the TPM operate in accordance with the TCG's PC-specific implementation specification.

System 200 supports execution of software components, such as operating system 202, applications 204, and drivers 206, on its platform 208. The software components may be received through a network, such as network 101 that is shown in FIG. 1A, or they may be stored, e.g., on hard disk 210. Platform 208 receives electrical power from power supply 212 for executing the software components on add-on cards 214 and motherboard 216, which includes typical components for executing software, such as CPU 218 and memory 220, although motherboard 216 may include multiple CPUs. Interfaces 222 connect motherboard 216 to other hardware components within system 200, and firmware 224 contains POST BIOS (power-on self-test basic input/output system) 226.

Motherboard 216 also comprises trusted building block (TBB) 228; motherboard 216 is supplied by a manufacturer with TBB 228 and other components physically or logically attached and supplied by the manufacturer. TBB 228 comprises the combination of the core root of trust for measurement (CRTM) component 230, the trusted platform module (TPM) 232, the connection of the CRTM to motherboard 216, and the connection of the TPM to motherboard 216.

TPM 232 is explained in more detail with respect to FIG. 3 hereinbelow. CRTM 230 is an immutable portion of the platform's initialization code that executes upon a platform reset; the platform's execution must begin at the CRTM upon any platform reset event. In this manner, the trust in the platform is based on the CRTM and the behavior of the TPM, and the trust in all measurements is based on the integrity of the CRTM. In the example that is shown in FIG. 2, the BIOS may be assumed to include a BIOS Boot Block and POST BIOS 226; each of these are independent components that can be updated independent of each other, wherein the manufacturer must control the update, modification, and maintenance of the BIOS Boot Block, but a third party supplier may update, modify, or maintain the POST BIOS component. In the example that is shown in FIG. 2, the CRTM may be assumed to be the BIOS Boot Block, and the POST BIOS is a measured component of the chain of trust. Alternatively, the CRTM may comprise the entire BIOS.

Figure 3:
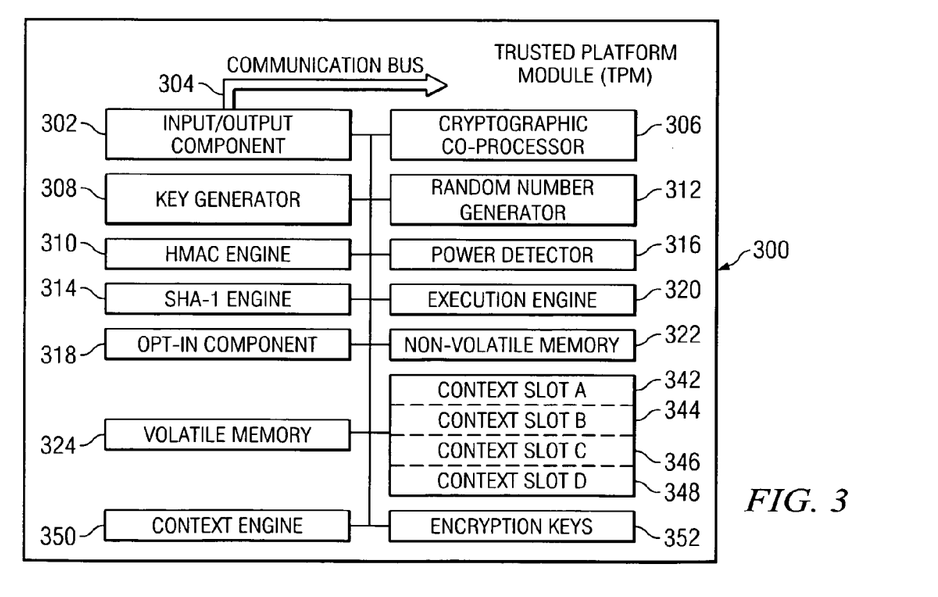
FIG. 3 depicts a block diagram that shows a modified trusted platform module (TPM) that includes some of the major components of a typical TPM according to Trusted Computing Group (TCG) specifications in addition to context swapping hardware according to the present invention.

FIG. 3 depicts a block diagram that illustrates a modified trusted platform module (TPM) that includes some of the major components of a typical TPM according to Trusted Computing Group (TCG) specifications in addition to context swapping hardware according to the present invention. Trusted platform module 300 comprises input/output component 302, which manages information flow over communications bus 304 by performing appropriate protocol encoding/decoding operations and routing of messages to appropriate components. Cryptographic co-processor 306 performs cryptographic operations within a trusted platform module. Key generator 308 creates symmetric keys and RSA asymmetric cryptographic key pairs. HMAC engine 310 performs HMAC (Keyed-Hashing for Message Authentication) calculations, whereby message authentication codes are computed using secret keys as integrity checks to validate information transmitted between two parties, e.g., in accordance with Krawczyk et al., "HMAC: Keyed-Hashing for Message Authentication", Request for Comments (RFC) 2104, Internet Engineering Task Force (IETF), February 1997.

Random number generator 312 acts as a source of randomness for the computation of various values, such as nonces, keys, or other values. SHA-1 engine 314 implements the SHA-1 hash algorithm. Power detector 316 manages the power states of a trusted platform module in association with the power states of the platform. Opt-in component 318 maintains the state of persistent and volatile flags and enforces semantics associated with those flags such that the trusted platform module may be enabled and disabled. Execution engine 320 runs program code to execute commands that the trust platform module receives through input/output component 302. Non-volatile memory 322 stores persistent identity and state associated with the trusted platform module; the non-volatile memory may store static data items but is also available for storing dynamic data items by entities that are authorized by the trusted platform module owner, whereas volatile memory 324 stores dynamic data items.

TPM 300 also includes multiple context slots, such as context slots 342, 344, 346, and 348. One context may be stored in each context slot at a time. A context includes the TPM state data and runtime TPM state that are associated with one partition. When a partition needs to use TPM 300, that partition's context must currently be stored in TPM 300 in one of its context slots.

A context engine 350 may be implemented in hardware as part of TPM 300, or may be implemented in hardware or software elsewhere in the data processing system that includes TPM 300. Context engine 350 executes the processes described below to store a partition's context in a context slot and to swap contexts into and out of the appropriate context slot.

Encryption keys 352 are stored within TPM 300. Various encryption keys may be utilized by TPM 300 in order to authenticate another device and/or to communicate with another device. Although encryption keys 352 are depicted separately from the other components of the TPM, the various encryption keys will typically be stored in non-volatile memory 322.

Figure 4:
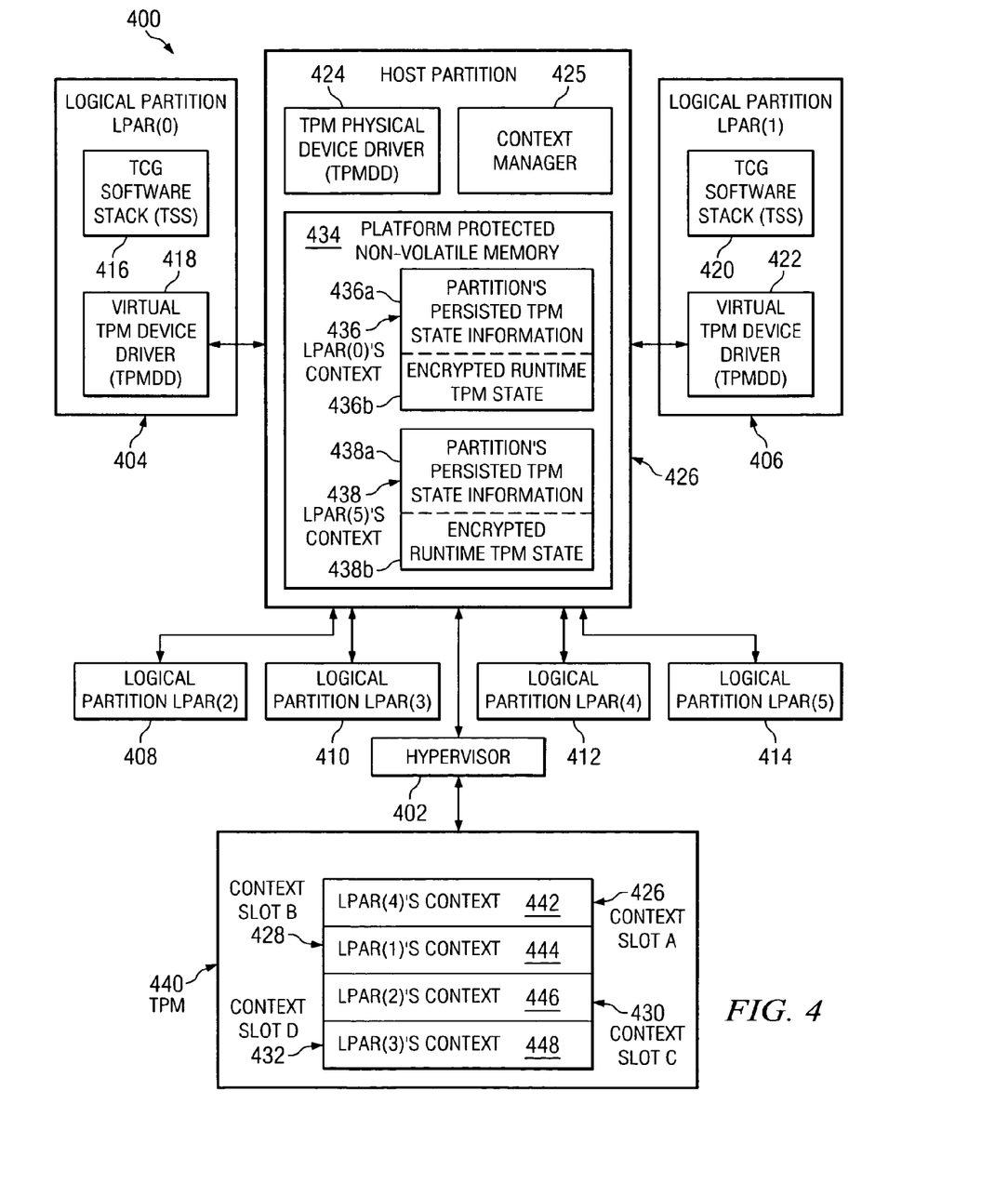
FIG. 4 depicts a block diagram that illustrates a scalable hardware TPM that provides trust to a scalable number of logical partitions in accordance with the present invention.

FIG. 4 depicts a block diagram that illustrates a scalable hardware TPM that provides trust to a scalable number of logical partitions in accordance with the present invention. Data processing system 400 contains a hypervisor 402 that supports multiple instances of one or more operating systems and/or logical partitions (LPAR) on the shared computational resources of data processing system 400. For example, hypervisor 402 supports LPARs 404, 406, 408, 410, 412, and 414.

Each LPAR includes a TCG software stack (TSS) and a TPM device driver (TPMDD). For example, LPAR 404 includes TSS 416 and TPMDD 418, while LPAR 406 includes TSS 420 and TPMDD 422. The other LPARs also include a TSS and TPMDD that are not depicted. TSS 416 and TSS 420 implement the specification of the host programming interfaces that an operating system, an application, or other software component utilizes to interface with a TPM. TSS comprises: the TSS service provider, to which an entity may interface via common application programming interfaces (APIs); the TSS core services, which provides centralized management of key storage, contexts, and handles the direct interaction with the TPM on the host; and the TPM device driver library and the TPMDD, such as TPMDD 418 or TPMDD 422. Generally, all interfacing to the TPM occurs through TSS service provider interface (TSPI) or an API above the TSPI.

Hypervisor 402 is firmware that is responsible for creating and enforcing the partitioning of platform 208 among the various partitions. Hypervisor 402 provides a set of firmware services to the operating system in each partition so that interference between operating system images is prevented. Each partition includes an operating system executing in that partition that may be the same as or different from the operating system that is executing in the other logical partitions. Hypervisor 402 manages the logical partitions, and allocates and manages the physical devices that are allocated to each partition.

Instead of permitting logical partitions to access a hardware TPM 440 directly, a virtual TPM is presented to each logical partition that utilizes TPM services, in this depiction LPAR 404 and LPAR 406. Each partition must use the host partition 426 to access its associated context within the physical TPM 440.

A TPM is specified as an I/O device with operations into it being asynchronous; in the present invention, hardware TPM 440 is represented as a virtual I/O device, i.e., a logical I/O device within the logical partition. Operations to hardware TPM 440, e.g., functional calls or requests from one of the partitions, such as LPAR 404, to context slot 444 within hardware TPM 440, are placed onto an input queue (not shown) included in hypervisor 402, which causes a trap into hypervisor 402. Hypervisor 402 re-queues the operation to context slot 444 within hardware TPM 440, where the TPM functions are performed on a first-in, first-out basis. When the TPM function is complete, context slot 444 within hardware TPM 440 places the results on an output queue (not shown) which also causes a trap into hypervisor 402; hypervisor 402 then passes the results back to the host partition 426, which ultimately delivers the result back to the calling entity (in this case logical partition 404) through the TPMDD 424.

Host partition 426 includes a context manager 425 which is responsible for routing the commands from the logical partition to the appropriate context slot once the context binding information that associates a particular context slot with a particular logical partition is retrieved from the partition's persistent information. Sometimes the context manager is also referred to as the context engine.

In an alternative embodiment, Physical TPM Device Driver 424 could be implemented within hypervisor 402. In a preferred embodiment, TPM Device Driver 424 is managed by hypervisor 402 within a host logical partition, shown as Host partition 426, which is logically part of the hypervisor, e.g., its code is maintained as part of the certified hypervisor; the hypervisor creates Host partition 426 upon each reboot.

A context is associated with each logical partition. The context includes the partition's persistent TPM state information and runtime TPM state. The persistent TPM state information must be stored in non-volatile storage, either on the platform or on the physical hardware TPM itself. The runtime state can be stored in one of several locations: platform non-volatile storage; within the physical hardware TPM's memory; or in the host partition's protected memory area as encrypted data. A partition's context is needed by the hardware TPM in order for the hardware TPM to provide its services to that partition. In order for the hardware TPM to provide its services to a particular partition, that partition's context must be stored within the hardware TPM itself. Limited storage, referred to herein as contexts slots, is available in the hardware TPM for storing contexts. When there are more logical partitions that need to be supported than there are total context slots in the hardware TPM, a problem can arise. The present invention provides a method, apparatus, and computer program product for managing a data processing system which includes a hardware TPM that has fewer context slots than there are logical partitions.

An example is depicted in FIG. 4 where the hardware TPM 440 includes only four context slots for storing contexts but must support six logical partitions. According to the present invention, up to four contexts may be concurrently stored in the available context slots in the hardware TPM 440. The remaining contexts that are not currently stored in context slots within hardware TPM 440 will be stored in protected storage within host partition 426. For example, LPAR(0) and LPAR(4) are both associated with the first context slot, context slot A 426. LPAR(1) and LPAR(5) are both associated with context slot B 428. LPAR(2) is associated with context slot C 430. And, LPAR(3) is associated with context slot D 432. Two different partitions share context slot A 426, and two other different partitions share context slot B 428. Since only one context at a time can be stored in a context slot, the other context associated with that slot will be stored in protected stored in host partition 426.

In the depicted example, the context 442 for LPAR(4) is currently stored in context slot A 426. Therefore, the context 436 for LPAR(0) is currently stored in the platform's protected non-volatile memory 434. As described above, each context includes two parts. Thus, the context 436 for LPAR(0) includes LPAR(0)'s persistent TPM state information 436a and the runtime TPM state 436b. Because the runtime TPM state is stored outside of TPM 440, it has been encrypted prior to storage in memory 434. Similarly, the context 438 for LPAR(5) includes LPAR(5)'s persistent TPM state information 438a and the encrypted runtime TPM state 438b. Context 438 is currently stored in memory 434 because the context slot, context slot B 428, which is associated with LPAR(5), is currently storing the context 444 for LPAR(1).

Only one partition is associated with context slot C 430, and only one partition is associated with context slot D 432. Therefore, swapping of contexts for these partitions will not be necessary because only one partition is associated with each slot. The context 446 for LPAR(2) is stored in context slot C 430. The context 448 for LPAR(3) is stored in context slot D 432. These contexts will remain in these context slots.

Figure 5:
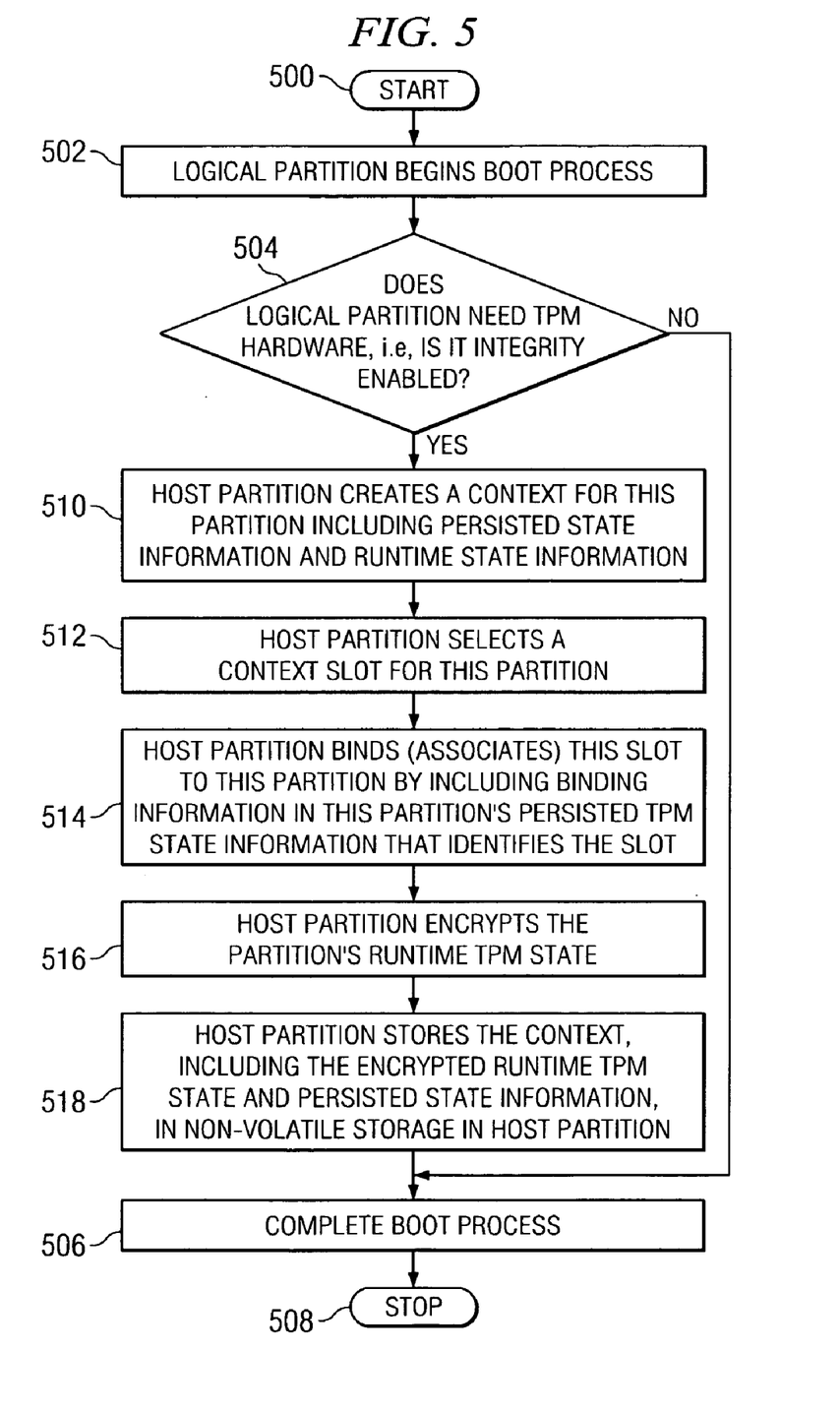
FIG. 5 illustrates a high level flow chart that depicts creating a context for a logical partition during booting of the data processing system which includes booting the partition in accordance with the present invention.

FIG. 5 illustrates a high level flow chart that depicts creating a context for a logical partition during booting of the partition in accordance with the present invention. The process starts as depicted by block 500 and thereafter passes to block 502 which illustrates one of the logical partitions beginning a boot process.

Next, block 504 depicts a determination of whether or not this booting logical partition needs to access the hardware TPM. When a partition requires the services of a TPM, the partition is referred to as being "integrity enabled". A flag is typically utilized to indicate whether a partition is to be integrity enabled. If the partition does not require the services of the TPM, the process passes to block 506 which illustrates completing the boot process. The process then terminates as depicted by block 508.

Referring again to block 504, if a determination is made that the partition does require the services of the hardware TPM, the process passes to block 510 which depicts the host partition creating a context for this partition. The context includes persistent state information and runtime state information for this partition. Next, block 512 illustrates the host partition selecting a context slot to be assigned to this partition.

Block 514, then, depicts the context manager in the host partition binding this slot to this partition by including binding information in this partition's persistent TPM state information. This binding information identifies this partition slot. The process of binding a particular slot to a particular partition is also referred to herein as associating the slot with the partition.

The process then passes to block 516 which illustrates the context manager in the host partition encrypting the partition's runtime TPM state. Thereafter, block 518 depicts the context manager in the host partition storing the partition's context, which includes the encrypted runtime TPM state and persistent state information, in non-volatile storage in the host partition. The process then passes to block 506.

Figure 6:
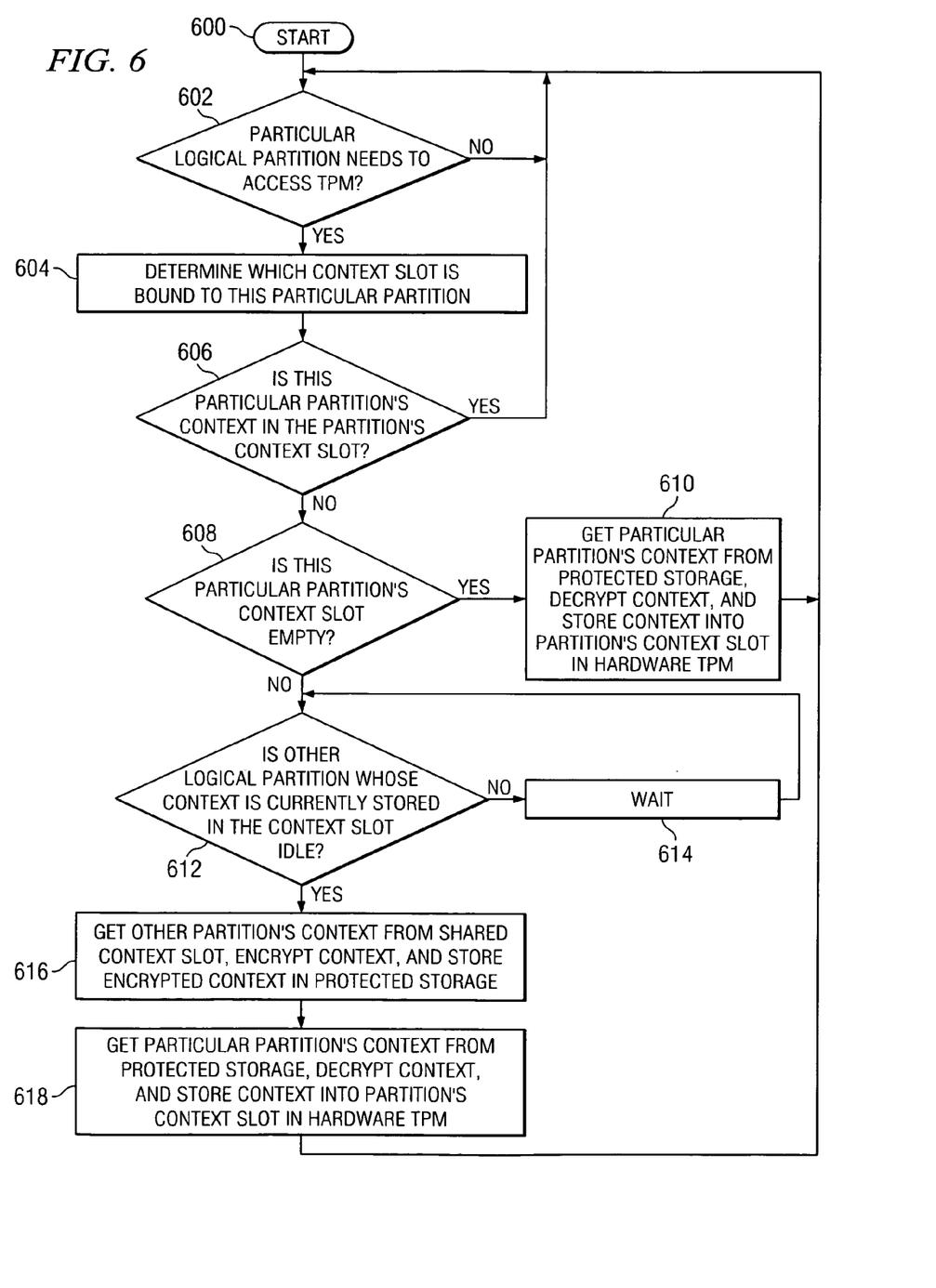
FIG. 6 depicts a high level flow chart that illustrates swapping contexts during runtime between context slots and other memory when a context slot is shared by multiple partitions in accordance with the present invention.

FIG. 6 depicts a high level flow chart that illustrates swapping contexts during runtime between context slots and other memory when a context slot is shared by multiple partitions in accordance with the present invention. The process starts at block 600 and thereafter passes to block 602 which illustrates a determination of whether or not a particular logical partition is requesting access to the hardware TPM. If a determination is made that no logical partition is requesting access to the hardware TPM, the process passes back to block 602. If a determination is made that a particular logical partition is requesting access to the hardware TPM, the process passes to block 604 which depicts the context manager determining which context slot is bound to this particular partition.

The process then passes to block 606 which illustrates a determination by the context manager of whether or not this partition's context is already stored in the context slot bound to this partition. If a determination is made that this partition's context is already stored in the partition's context slot, the process passes back to block 602. Referring again to block 606, if a determination is made that this partition's context is not already stored in the partition's context slot, the process passes to block 608 which illustrates a determination by the context manger of whether or not this partition's context slot is empty. If a determination is made that this partition's context slot is empty, the process passes to block 610 which depicts the context manager getting the particular partition's context from protected storage, decrypting the context, and storing the context into the particular partition's context slot in the hardware TPM. The process then passes back to block 602.

Referring again to block 608, if a determination is made that this particular partition's context slot is not empty, the process passes to block 612 which illustrates a determination by the context manager of whether the other logical partition that is also bound to this slot, whose context is currently stored in the context slot, is idle. If a determination is made that the other partition is not idle, the process passes to block 614 which depicts waiting. The process then passes back to block 612.

Referring again to block 612, if a determination is made that the other partition is idle, the process passes to block 616 which illustrates getting the other partition's context from the shared context slot, encrypting the context, and storing the encrypted context in protected storage. Thus, the other partition's context is migrated from the shared context slot to protected storage. Next, block 618 depicts getting the particular partition's context from protected storage, decrypting the context, and storing the context into the particular partition's context slot in the hardware TPM. Thus, the particular partition's context is migrated from protected storage into the context slot. The process then passes back to block 602.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for implementing a trusted computing environment within a data processing system, said data processing system including a single hardware trusted platform module (TPM), the method comprising:

providing a plurality of logical partitions and a host partition in said data processing system, wherein said host partition is not included in said plurality of logical partitions, and wherein said TPM does not include said plurality of logical partitions or said host partition;

generating, by said host partition, a unique context for each one of said plurality of logical partitions, said context required to be stored in said hardware TPM when one of said plurality of logical partitions requires access to said hardware TPM, wherein each said context includes persistent TPM state information and runtime TPM state for one of said plurality of logical partitions for which said context was generated;

associating, by a context manager that is included in said host partition, each one of said partitions with one of a plurality of context storage slots in said hardware TPM, at least one of said plurality of context slots being simultaneously associated with more than one of said plurality of logical partitions;

encrypting, by said context manager, said context that was generated for each one of said plurality of logical partitions;

storing, by said context manager, said encrypted context that was generated for each one of said plurality of logical partitions in non-volatile storage in said host partition when said encrypted context is not stored in said hardware TPM;

including, within said host partition, a TPM physical device driver;

including in each one of said plurality of logical partitions a separate virtual TPM device driver;

presenting, by said host partition, a separate virtual TPM to each one of said plurality of logical partitions, wherein each one of said plurality of logical partitions cannot access said hardware TPM directly and must use said virtual TPM that is presented to each one of said plurality of logical partitions to access said hardware TPM; and swapping contexts into and out of said hardware TPM during runtime of said data processing system when ones of said plurality of partitions require access to said hardware TPM, contexts associated with said ones of said plurality of partitions being physically stored in said hardware TPM.

2. The method according to claim 1, further comprising:
providing a first number of context storage slots in said hardware TPM;
booting a second number of logical partitions in said data processing system, each of said booted partitions having an associated context, wherein a second number of contexts exist, and wherein said second number of logical partitions is greater than said first number of context storage slots; and
said hardware TPM being concurrently accessible by said second number of logical partitions by providing storage within said hardware TPM to said second number of contexts.

3. The method according to claim 1, further comprising:
during booting of one of said plurality of logical partitions:
generating a context for said one of said plurality of logical partitions;
selecting one of said plurality of context slots; and
associating said selected one of said plurality of context slots with said one of said plurality of logical partitions.

4. The method according to claim 3, further comprising:
associating said selected one of said plurality of context slots with said one of said plurality of logical partitions by storing binding information, which identifies said selected one of said plurality of context slots, in said persistent TPM state information in said context that was generated for said one of said logical partitions.

5. The method according to claim 1, further comprising:
determining whether one of plurality of logical partitions needs to access said hardware TPM;
in response to determining that said one of said plurality of logical partitions needs to access said hardware TPM, identifying which one of said plurality of context slots is associated with said one of said plurality of logical partitions;
determining whether a context generated for said one of said plurality of logical partitions is currently stored in said identified one of said plurality of context slots that is associated with said one of said plurality of logical partitions; and
in response to determining that said context generated for said one of said plurality of logical partitions is currently stored in said identified one of said plurality of context slots that is associated with said one of said plurality of logical partitions, granting access to said hardware TPM to said one of said plurality of logical partitions.

6. The method according to claim 5, further comprising:
in response to determining that said context generated for said one of said plurality of logical partitions is not currently stored in said identified one of said plurality of context slots that is associated with said one of said plurality of logical partitions, determining whether said identified one of said plurality of context slots is currently empty; and
in response to determining that said identified one of said plurality of context slots is currently empty, storing said context that was generated for said one of said plurality of logical partitions in said identified one of said plurality of context slots.

7. The method according to claim 6, further comprising:
prior to storing said context that was generated for said one of said plurality of logical partitions in said identified one of said plurality of context slots: retrieving said context that was generated for said one of said plurality of logical partitions from said non-volatile storage in said host partition, and decrypting said retrieved context by said hardware TPM; and
storing said decrypted context in said identified one of said plurality of context slots.

8. The method according to claim 6, further comprising:
in response to determining that said identified one of said plurality of context slots is not currently empty, identifying another one of said plurality of logical partitions that is associated with one of said plurality of contexts that is currently stored in said identified one of said plurality of context slots;
determining whether said identified another one of said plurality of logical partitions is currently idle;
in response to determining that said identified another one of said plurality of logical partitions is not currently idle, waiting until said identified another one of said plurality of logical partitions is currently idle;
in response to determining that said identified another one of said plurality of logical partitions is currently idle: removing said one of said plurality of contexts that is currently stored in said identified one of said plurality of context slots, encrypting said removed one of said plurality of contexts, storing said encrypted removed one of said plurality of contexts in said non-volatile storage, retrieving said context that was generated for said one of said plurality of logical partitions from said non-volatile storage, decrypting by said hardware TPM said context retrieved from said storage, and storing said decrypted context in said identified one of said plurality of context slots.

9. An apparatus for implementing a trusted computing environment within a data processing system, said data processing system including a single hardware trusted platform module (TPM), the apparatus comprising:
- a plurality of logical partitions and a host partition in said data processing system, wherein said host partition is not included in said plurality of logical partitions, and wherein said TPM does not include said plurality of logical partitions or said host partition;
- a unique context that is generated by said host partition for each one of said plurality of logical partitions, said context required to be stored in said hardware TPM when one of said plurality of logical partitions requires access to said hardware TPM, wherein each said context includes persistent TPM state information and runtime TPM state for one of said plurality of logical partitions for which said context was generated;
- a context manager, which is included in said host partition, for associating each one of said partitions with one of a plurality of context storage slots in said hardware TPM, at least one of said plurality of context slots being simultaneously associated with more than one of said plurality of logical partitions;
- said context manager for encrypting said context that was generated for each one of said plurality of logical partitions;
- said context manager for storing said encrypted context that was generated for each one of said plurality of logical partitions in non-volatile storage in said host partition when said encrypted context is not stored in said hardware TPM;
- a TPM physical device driver included within said host partition;
- a separate virtual TPM device driver that is included in each one of said logical partitions;
- said host partition presenting a separate virtual TPM to each one of said plurality of logical partitions, wherein each one of said plurality of logical partitions cannot access said hardware TPM directly and must use said virtual TPM that is presented to each one of said plurality of logical partitions to access said hardware TPM; and
- said context manager for swapping contexts into and out of said hardware TPM during runtime of said data processing system when ones of said plurality of partitions require access to said hardware TPM, contexts associated with said ones of said plurality of partitions being physically stored in said hardware TPM.

10. The apparatus according to claim 9, further comprising:
- a first number of context storage slots in said hardware TPM;
- a second number of logical partitions in said data processing system being booted, each of said booted logical partitions having an associated context, wherein a second number of contexts exist, and wherein said second number of logical partitions is greater than said first number of context storage slots; and
- said hardware TPM being concurrently accessible by said second number of partitions by providing storage within said hardware TPM to said second number of contexts.

11. The apparatus according to claim 9, further comprising:
- during booting of one of said plurality of logical partitions:
- a context being generated for said one of said plurality of logical partitions;
- one of said plurality of context slots being selected; and
- said context manager for associating said selected one of said plurality of context slots with said one of said plurality of logical partitions.

12. The apparatus according to claim 11, further comprising:
- said context manager for associating said selected one of said plurality of context slots with said one of said plurality of logical partitions by storing binding information, which identifies said selected one of said plurality of context slots, in said persistent TPM state information in said context that was generated for said one of said logical partitions.

13. The apparatus according to claim 9, further comprising:
- one of plurality of logical partitions needing to access said hardware TPM;
- in response to determining that said one of said plurality of logical partitions needs to access said hardware TPM, said context manager for identifying which one of said plurality of context slots is associated with said one of said plurality of logical partitions;
- said context manager for determining whether a context generated for said one of said plurality of logical partitions is currently stored in said identified one of said plurality of context slots that is associated with said one of said plurality of logical partitions; and
- in response to determining that said context generated for said one of said plurality of logical partitions is currently stored in said identified one of said plurality of context slots that is associated with said one of said plurality of logical partitions, said hardware TPM being accessible to said one of said plurality of logical partitions.

14. The apparatus according to claim 13, further comprising:
- in response to determining that said context generated for said one of said plurality of logical partitions is not currently stored in said identified one of said plurality of context slots that is associated with said one of said plurality of logical partitions, said context manager for determining whether said identified one of said plurality of context slots is currently empty; and
- in response to determining that said identified one of said plurality of context slots is currently empty, said context manager for storing said context that was generated for said one of said plurality of logical partitions in said identified one of said plurality of context slots.

15. The apparatus according to claim 14, further comprising:
- prior to storing said context that was generated for said one of said plurality of logical partitions in said identified one of said plurality of context slots: said context manager for retrieving said context that was generated for said one of said plurality of logical partitions from said non-volatile storage in said host partition, and for decrypting said retrieved context by said hardware TPM; and
- said context manager for storing said decrypted context in said identified one of said plurality of context slots.

16. The apparatus according to claim 14, further comprising:
- in response to determining that said identified one of said plurality of context slots is not currently empty, said context manager for identifying another one of said plurality of logical partitions that is associated with one of said plurality of contexts that is currently stored in said identified one of said plurality of context slots;
- said context manager for determining whether said identified another one of said plurality of logical partitions is currently idle;
- in response to determining that said identified another one of said plurality of logical partitions is not currently idle, said context manager for waiting until said identified another one of said plurality of logical partitions is currently idle;
- in response to determining that said identified another one of said plurality of logical partitions is currently idle: said context manager for removing said one of said plurality of contexts that is currently stored in said identified one of said plurality of context slots, for encrypting said removed one of said plurality of contexts, for storing said encrypted removed one of said plurality of contexts in said non-volatile storage in said host partition, for retrieving said context that was generated for said one of said plurality of logical partitions from said non-volatile storage for decrypting by said hardware TPM said context retrieved from said storage, and for storing said decrypted context in said identified one of said plurality of context slots.

* * * * *